United States Patent
Harris et al.

(10) Patent No.: US 9,032,301 B2
(45) Date of Patent: May 12, 2015

(54) CROWD-SYNC TECHNOLOGY FOR PARTICIPANT-SHARING OF A CROWD EXPERIENCE

(71) Applicant: LiveCrowds, Inc., San Francisco, CA (US)

(72) Inventors: Paul Andrew Harris, Thornton, NH (US); John Frederick Yearout, Mill Valley, CA (US)

(73) Assignee: LiveCrowds, Inc., San Francisco, CA (US)

( * ) Notice: Subject to any disclaimer, the term of this patent is extended or adjusted under 35 U.S.C. 154(b) by 291 days.

(21) Appl. No.: 13/669,374

(22) Filed: Nov. 5, 2012

(65) Prior Publication Data

US 2014/0129946 A1 May 8, 2014

(51) Int. Cl.
| | |
|---|---|
| *G06F 3/048* | (2013.01) |
| *G06F 3/0481* | (2013.01) |
| G06F 3/01 | (2006.01) |
| H04L 12/18 | (2006.01) |
| G06Q 10/10 | (2012.01) |

(52) U.S. Cl.
CPC ............... *G06F 3/01* (2013.01); *H04L 12/1822* (2013.01); *G06Q 10/107* (2013.01); *G06Q 10/10* (2013.01); *G06Q 10/109* (2013.01); *G06F 3/0481* (2013.01)

(58) Field of Classification Search
CPC .. H04L 29/06; H04L 29/08072; G06Q 10/10; G06F 3/0481; G06F 9/4443
USPC .................................. 715/733, 750, 751, 759
See application file for complete search history.

(56) References Cited

U.S. PATENT DOCUMENTS

| | | | | |
|---|---|---|---|---|
| 6,965,785 | B2 * | 11/2005 | Mager et al. | 455/566 |
| 8,400,959 | B2 * | 3/2013 | Doi et al. | 370/324 |
| 2006/0156374 | A1 * | 7/2006 | Hu et al. | 725/135 |
| 2012/0165100 | A1 * | 6/2012 | Lalancette et al. | 463/42 |
| 2012/0184304 | A1 * | 7/2012 | Walsh et al. | 455/457 |

OTHER PUBLICATIONS

Cisco Webex, Why WebEx? Connect with anyone, anywhere, anytime. [online] [retrieved on Dec. 12, 2012] URL: http://www.webex.com/why-webex/overview.html.
Gotomeeting, How It Works, [online] [retrieved on Dec. 12, 2012] URL: http://www.gotomeeting.com/fec/online_meeting.

* cited by examiner

*Primary Examiner* — Nicholas Augustine
(74) *Attorney, Agent, or Firm* — Brian S. Boyer; Syndicated Law, PC

(57) ABSTRACT

The systems and methods taught herein provide a choreographed, crowd forum at an event, including offering to send a media display to a plurality of participants in a crowd attending the event. Each of the plurality of participants have (i) a close-visual proximity to other participants; and, (ii) it's own respective computing device with a graphical user interface, a processor, a database, and a choreography. Each respective computing device is operable to at least receive and display a choreographed portion of the crowd media display. The choreographed portions can be configured to be received and displayed by each respective computing device in a choreographed manner in the crowd coordinated with an activity at the event. In this manner, the plurality of participants have at least the experience of receiving and displaying a respective choreographed portion of the crowd media display at the event.

30 Claims, 8 Drawing Sheets

CROWD-SYNC TECHNOLOGY FOR PARTICIPANT-SHARING OF A CROWD EXPERIENCE

BACKGROUND

1. Field of the Invention

The teachings generally relate to a method of displaying media in a choreographed manner among independent participants in a crowd at an event to enhance the experience of each of a plurality of participants in a crowd at an event.

2. Description of the Related Art

Crowds are defined by their shared emotional experiences. A member of a crowd can experience a feeling of stimulation and excitement, and this experience can draw them to an event. It's common for people in a crowd to feel a bit empowered by sharing a sentiment or feeling with those around them, acting differently than when they're alone. People in a group tend to share a way of thinking, and this can be a positive experience, becoming more enthusiastic about an event or happening. As such, people can use a crowd setting to enhance the enjoyment of an event. This positive aspect of crowd mentality creates desire to attend events having a large number of people that are there to share an experience.

There is much room for improvement of the crowd experience. Currently, there are shared video screens and loudspeakers to communicate to the masses in a crowd, but the communication is limited and one-way, such that a participant in a crowd may or may not catch the message, cannot ask questions, and cannot otherwise participate or communicate with others. Likewise, the participant cannot often timely respond to an action at the event at a time when others in the crowd are responding in sync with one-another. Moreover, the participant may not quite know how to respond, such as what to say, who to say it to, and when to say it with the crowd. These limitations in communication among the crowd provide an opportunity to improve the crowd experience, as well as to mitigate the risks of participating in a crowd that are created by the impeded communication, such as the risk of losing your child, suffering inclement weather, not knowing a safe route of escape in the event of a threat or catastrophe, and the like.

Accordingly, and for at least the above reasons, the public will appreciate having systems and methods of enhancing communication within a crowd setting, namely new and useful ways of (i) communicating to people in a crowd, in unison or in series, and in a synchronized and individual manner; (ii) choreographing a reaction from the people in the crowd to elicit a desired response in a timed or synchronized manner on an individual basis; (iii) enhancing the crowd experience for the people in the crowd by providing additional means of communication to, and among, each other using multimedia on an individual basis; (iv) receiving communications from, and among, the people in the crowd; (v) warning the crowd of actual or potential dangers and/or risks relating to the event; and, (vi) providing virtual users attending the crowd through an internet connection with a means for participating and communicating with the crowd.

SUMMARY

The teachings generally relate to systems and methods for displaying media in a choreographed manner among participants in a crowd at an event to enhance the experience of each of the participants at the event. As such, the teachings include a method of displaying media in a choreographed manner among independent participants in the crowd at the event in connection with an activity at the event.

In some embodiments, the method comprises providing a choreographed, crowd forum at an event, the providing including offering to send a crowd media display to a plurality of participants in a crowd attending the event, each of the plurality of participants having (i) a close-visual proximity to other participants; and, (ii) it's own respective computing device with a graphical user interface, a processor, a database embodied in a non-transitory computer readable storage medium, and a choreography module embodied in a non-transitory computer readable storage medium, the respective computing device operable to at least receive and display a choreographed portion of the crowd media display. And, in these embodiments, each of the choreographed portions can be configured to be received and displayed by each respective computing device within the plurality of participants in the crowd in a choreographed manner coordinated with an activity at the event. In this manner, the method facilitates a participation by each of the plurality of participants that includes at least the experience of receiving and displaying a respective choreographed portion of the crowd media display.

In some embodiments, the method further comprises offering to send a crowd media display to one or more virtual users having a virtual presence at the event through a network connection. In these embodiments, each of the one or more virtual users can have it's own respective computing device with a graphical user interface, a processor, a database embodied in a non-transitory computer readable storage medium, and a choreography module embodied in a non-transitory computer readable storage medium; wherein, each of the choreographed portions is configured to be received and displayed by each respective computing device within the one or more virtual users in the crowd in a choreographed manner coordinated with an activity at the event, facilitating a participation by each of the one or more virtual users that includes at least receiving and displaying it's respective choreographed portion of the crowd media display.

The teachings are also directed to a system for displaying a portion of a choreographed crowd media display. In these embodiments, the system comprises a processor; a graphical user interface; and, a choreography module embodied in a non-transitory computer readable storage medium for receiving and displaying a choreographed portion of a crowd media display to the graphical user interface of at least one of a plurality of participants attending an event, each of the plurality of participants having (i) a close-visual proximity to other participants; and, (ii) it's own respective computing device with a graphical user interface, a processor, a database embodied in a non-transitory computer readable storage medium, and a choreography module embodied in a non-transitory computer readable storage medium, the respective computing device operable to at least receive and display a respective choreographed portion of the crowd media display. And, in these embodiments, each of the choreographed portions can be configured to be received and displayed by the choreography module of each respective computing device within the plurality of participants in the crowd in a choreographed manner coordinated with an activity at the event. In this way, the system facilitates a participation by each of the plurality of participants that includes at least the experience of receiving and displaying it's respective choreographed portion of the crowd media display.

The teachings also include a system for displaying media in portions among independent users in a crowd setting in a choreographed manner. In these embodiments, the system comprises a shared processor; a shared database embodied in a non-transitory computer readable storage medium for storing a choreographed crowd media display in portions for distribution, respectively, to each of a plurality of participants attending an event; and, a shared distribution engine embodied in a non-transitory computer readable storage medium for distributing the choreographed crowd media in the respective portions to each of the plurality of participants attending the event. In these embodiments, the system also includes a first computing device having first processor; a first graphical user interface; and, a first choreography module embodied in a non-transitory computer readable storage medium for receiving and displaying a first media display to the first graphical user interface of a first participant within the plurality of participants; wherein, the first media display is a first portion of the choreographed crowd media display. And, in order to have a plurality, these systems also include a second computing device having a second processor; a second graphical user interface; and, a second choreography module embodied in a non-transitory computer readable storage medium for receiving and displaying a second media display to the second graphical user interface of a second participant within the plurality of participants; wherein, the second media display is a second portion of the choreographed crowd media display. And, in most embodiments, the systems can include an $n^{th}$ computing device having an $n^{th}$ processor; an $n^{th}$ graphical user interface; and, an $n^{th}$ choreography module embodied in a non-transitory computer readable storage medium for receiving and displaying an $n^{th}$ media display to the $n^{th}$ graphical user interface of an $n^{th}$ user within the plurality of participants; wherein, the $n^{th}$ media display is an $n^{th}$ portion of the choreographed crowd media display; wherein, n ranges from 3 to the total number of participants attending the event; and, each of the plurality of participants are offered an experience at the event that includes participating with the activity of the event, the experience including at least receiving and displaying it's respective choreographed portion of the crowd media display.

Systems can be configured for virtual users that are not attending the event in-person but, rather, virtually through a network connection. In some embodiments, the methods and systems taught herein can further comprise a choreography module for a virtual user having a virtual presence at the event through a network connection. In these embodiments, the system can include a choreography module embodied in a non-transitory computer readable storage medium for receiving and displaying a choreographed portion of a crowd media display to the graphical user interface of the virtual user; wherein, the choreographed portion can be configured to be received and displayed by the virtual user in a choreographed manner coordinated with an activity at the event, facilitating a participation by the virtual user with the crowd that includes at least receiving and displaying it's respective choreographed portion of the crowd media display.

In some embodiments, the methods and systems taught herein further comprise a social networking functionality. In these embodiments, the computing devices can have a social networking module on a non-transitory computer readable medium for receiving and sending a social networking media to the respective graphical user interface, the social networking media comprising a component selected from the group consisting of a user-created marketplace display, a user-specific group display, a user-publicized event display, a user-customized public page display, a user-presence and chat display, and a combination thereof.

It should be appreciated that any computing device, whether or not having any other substantial purpose, can be used. In some embodiments, the computing devices include a handheld device having no other substantial purpose. In some embodiments, the computing devices include a personal computer (PC), or perhaps a handheld device such as, for example, a cell phone, a smart phone, a PDA, a laptop, an APPLE iPAD, a GOOGLE NEXUS tablet, AMAZON KINDLE FIRE, and the like. In some embodiments, for example, the computing devices in the plurality of participants include any combination of one or more handheld devices, and the sending or receiving of the crowd media display can be controlled by a motion of the one or more handheld devices. In some embodiments, the computing device of a virtual user, for example, can often be a personal computer (PC).

It should also be appreciated that any event having a plurality of participants can be the environment in which the methods and systems taught herein provide the experience. In some embodiments, the event is an entertainment event, a media event, a bidding event, a voting event, or a combination thereof.

It should also be appreciated that any one, or any combination of, media can be displayed. The media can be delivered to participants/virtual users in any combination, in series as a random or systemic happening, or perhaps in unison, for example, using the methods and systems taught herein. In some embodiments, the choreographed crowd media display includes audio, video, text, or a combination thereof. And, in some embodiments, the choreographed crowd media display occurs among the plurality of participants/virtual users in any combination, in series as a random or systemic happening, or perhaps in unison, for example, using the methods and systems taught herein.

It should also be appreciated that any participant/virtual user can control an offering of a media display. The offering can also be controlled from central location that is not a participant or virtual user but, rather, as a producer, director, or other dedicated administrator. In some embodiments, an administrative user is included in the methods and systems taught herein, and the offering and/or sending is controlled by the administrative user. For example, in some embodiments, the choreography module, shared or independent, can be configured to include an administrative function to facilitate an offering of the choreographed crowd media display to the plurality of participants.

It should also be appreciated that any number of participants that could be envisioned in a crowd gathering can experience the methods and systems taught herein. In some embodiments, the plurality of participants comprises at least 1000 participants. And, in some embodiments, the plurality of participants can range from about 10 to about 100,000, from about 100 to about 10,000, from about 1000 to about 50,000, from about 2000 to about 5000, including at least 10, at least 100, at least 500, at least 1000, at least 2000, at least 3000, at least 5000, at least 10,000, at least 15,000, at least 20,000, at least 25,000, at least 30,000, at least 50,000, at least 100,000, any range of participants therein, or any number of participants therein in increments of 10.

DETAILED DESCRIPTION

Figure 1:
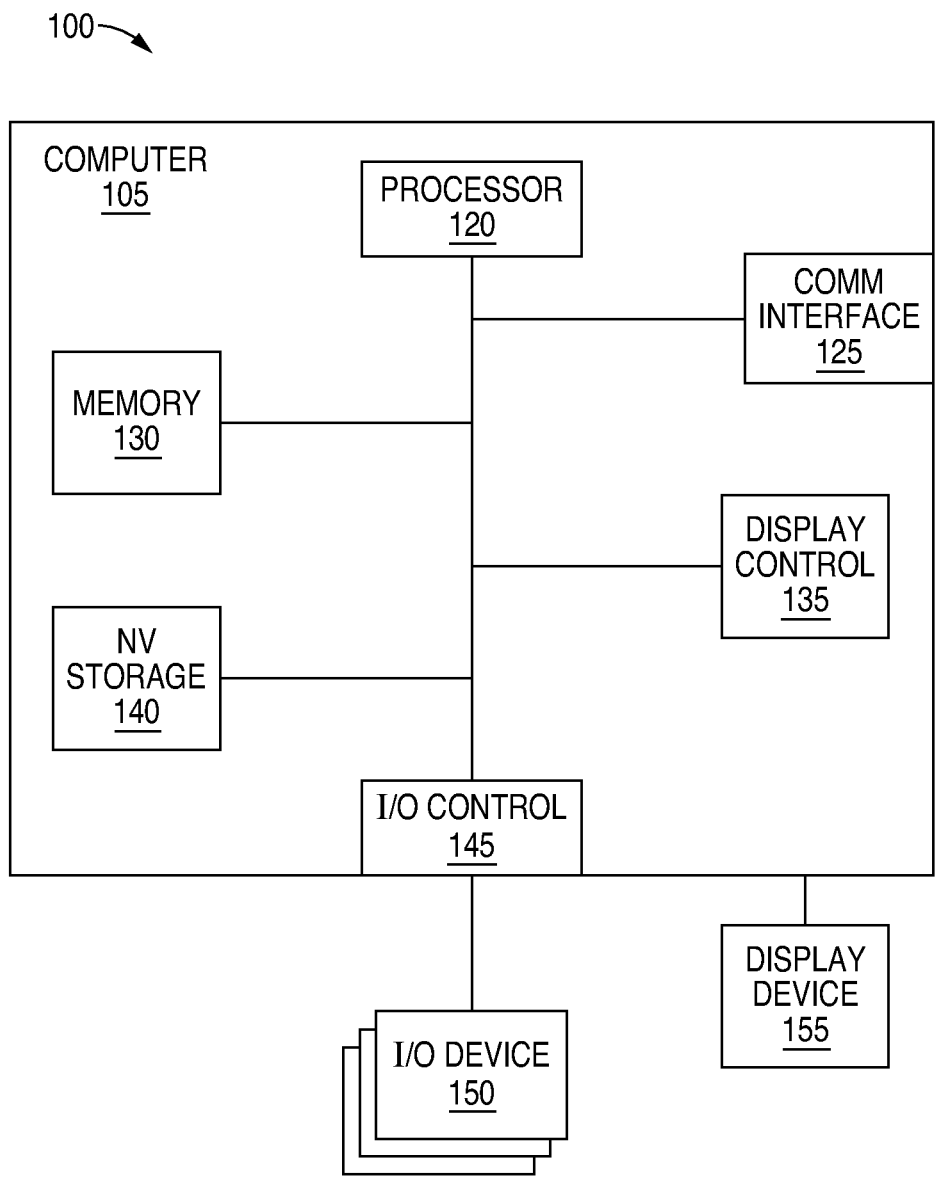
FIG. 1 shows a general technology platform for systems that can be used in the practice of the methods taught herein, according to some embodiments.

The teachings generally relate to systems and methods for displaying media in a choreographed manner among participants in a crowd at an event to enhance the experience of each of the participants at the event. As such, the teachings include a method of displaying media in a choreographed manner among independent participants in the crowd at the event in connection with an activity at the event. The participants, virtual users, players/celebrities, and administrators (collectively, and in any combination, "users") compose at least a portion of a network community that can contribute to the experience that the systems and methods add to the event. The term "choreograph," "choreographed," "choreography," and the like, can be used interchangeably in most embodiments. In some embodiments, the term can be used to refer to staging of a display for one or more participants or virtual users. As such, the term can be used to refer to (i) designing compilations or sequences of displays, movements, or other actions verbal or otherwise, in which motion, form, or both are specified, or guided, directly or indirectly; and/or (ii) the design itself of the compilations or sequences of displays, movements, or other actions verbal or otherwise, in which motion, form, or both are specified, or guided, directly or indirectly. The term "portion" can be used to refer to any portion of a media, for example, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, or any portion therein in increments of 1%. As such, the portion can be a complete display or a part of a display, such that the display can be a whole display for the participant to enjoy, or it can be a portion, for example, of a mosaic, a sequence of colors, sounds, letters, a combination thereof, or the like, as described herein.

In some embodiments, the method comprises providing a choreographed, crowd forum at an event, the providing including offering to send a crowd media display to a plurality of participants in a crowd attending the event, each of the plurality of participants having (i) a close-visual proximity to other participants; and, (ii) it's own respective computing device with a graphical user interface, a processor, a database embodied in a non-transitory computer readable storage medium, and a choreography module embodied in a non-transitory computer readable storage medium, the respective computing device operable to at least receive and display a choreographed portion of the crowd media display. And, in these embodiments, each of the choreographed portions can be configured to be received and displayed by each respective computing device within the plurality of participants in the crowd in a choreographed manner coordinated with an activity at the event. In this manner, the method facilitates a participation by each of the plurality of participants that includes at least the experience of receiving and displaying a respective choreographed portion of the crowd media display.

The term "close-visual proximity" can be used to refer to the distance between participants, such that the participants attending the event can see one or more portions of the crowd media display. For example, a close-visual proximity can range from about 0.33 yards to about 1000 yards, from about 1 yard to about 1000 yards, about 1 yard to about 800 yards, about 1 yard to about 700 yards, about 1 yard to about 600 yards, about 1 yard to about 500 yards, about 1 yard to about 300 yards, about 1 yard to about 100 yards, about 1 yard to about 50 yards, about 1 yard to about 30 yards, about 1 yard to about 20 yards, about 1 yards to about 10 yards, about 2 yards to about 5 yards, or any range or distance therein in increments of 0.5 yards. In some embodiments, a close-visual proximity can range from about 0.33 feet to about 1000 feet, from about 1 foot to about 1000 feet, about 1 foot to about 800 feet, about 1 foot to about 700 feet, about 1 foot to about 600 feet, about 1 foot to about 500 feet, about 1 foot to about 300 feet, about 1 foot to about 100 feet, about 1 foot to about 50 feet, about 1 foot to about 30 feet, about 1 foot to about 20 feet, about 1 foot to about 10 feet, about 2 feet to about 5 feet, or any range or distance therein in increments of 0.5 feet.

In some embodiments, the method further comprises offering to send a crowd media display to one or more virtual users having a virtual presence at the event through a network connection. In these embodiments, each of the one or more virtual users can have it's own respective computing device with a graphical user interface, a processor, a database embodied in a non-transitory computer readable storage medium, and a choreography module embodied in a non-transitory computer readable storage medium; wherein, each of the choreographed portions is configured to be received and displayed by each respective computing device within the one or more virtual users in the crowd in a choreographed manner coordinated with an activity at the event, facilitating a participation by each of the one or more virtual users that includes at least receiving and displaying it's respective choreographed portion of the crowd media display.

It should be appreciated that any portion or all of an information sharing between the plurality of users and/or virtual users can occur through a network connection. In some embodiments, a network includes a computer network, and the network can be an internet or intranet system. As such, the network can provide an internet portal for public submissions of virtual performances, in some embodiments. As such, it should be appreciated that a network can include a public venue, such as a broadcasting venue including, but not limited to, television, radio, or satellite broadcasting systems.

FIG. 1 shows a general technology platform for systems that can be used in the practice of the methods taught herein, according to some embodiments. The computer system 100 may be a conventional computer system and includes a computer 105, I/O devices 110, and a display device 115. The computer 105 can include a processor 120, a communications interface 125, memory 130, display controller 135, non-volatile storage 140, and I/O controller 145. The computer system 100 may be coupled to or include the I/O devices 150 and display device 155.

The computer 105 interfaces to external systems through the communications interface 125, which may include a modem or network interface. It will be appreciated that the communications interface 125 can be considered to be part of the computer system 100 or a part of the computer 105. The communications interface 125 can be an analog modem, isdn modem, cable modem, token ring interface, satellite transmission interface (e.g. "direct PC"), or other interfaces for coupling the computer system 100 to other computer systems. In a cellular telephone or PDA, for example, this interface is typically a radio interface for communication with a cellular network and may also include some form of cabled interface for use with an immediately available personal computer. In a two-way pager, the communications interface 125 is typically a radio interface for communication with a data transmission network but may similarly include a cabled or cradled interface as well. In a personal digital assistant, for example, the communications interface 125 typically can include a cradled or cabled interface and may also include some form of radio interface, such as a BLUETOOTH or 802.11 interface, or a cellular radio interface.

The processor 120 may be, for example, any conventional microprocessor known to one of skill. For example, the microprocessor may be an Intel Pentium microprocessor or Motorola power PC microprocessor, a Texas Instruments digital signal processor, or a combination of such components. Other microprocessors include AMD Athlon, Turion and Phenom lines, as well as other INTEL types, for example, CELERON, CORE, XEON, A100, EP80579, and ATOM.

The memory 130 is coupled to the processor 120 by a bus. The memory 130 can be dynamic random access memory (DRAM) and can also include static ram (SRAM). The bus couples the processor 120 to the memory 130, also to the non-volatile storage 140, to the display controller 135, and to the I/O controller 145.

The I/O devices 150 can include a keyboard, disk drives, printers, a scanner, and other input and output devices, including a mouse or other pointing device. The display controller 136 may control in the conventional manner a display on the display device 155, which can be, for example, a cathode ray tube (CRT) or liquid crystal display (LCD). The display controller 135 and the I/O controller 145 can be implemented with conventional well known technology, meaning that they may be integrated together, for example.

The non-volatile storage 140 is often a FLASH memory or read-only memory, or some combination of the two. Any non-volatile storage can be used. A magnetic hard disk, an optical disk, or another form of storage for large amounts of data may also be used in some embodiments, although the form factors for such devices typically preclude installation as a permanent component in some devices. Rather, a mass storage device on another computer is typically used in conjunction with the more limited storage of some devices. Some of this data is often written, by a direct memory access process, into memory 130 during execution of software in the computer 105. One of skill in the art will immediately recognize that the terms "machine-readable medium," "computer-readable storage medium," or "computer-readable medium" includes any type of storage device that is accessible by the processor 120 and also encompasses a carrier wave that encodes a data signal. Objects, methods, inline caches, cache states and other object-oriented components may be stored in the non-volatile storage 140, or written into memory 130 during execution of, for example, an object-oriented software program. In some embodiments, these media can include modules or engines, for example, in which the modules or engines are complete, in that they can include the software, hardware, software/hardware combinations, and any other components recognized by one of skill that enable their operability in their functions as taught herein.

The computer system 100 is one example of many possible different architectures. For example, personal computers based on an Intel microprocessor often have multiple buses, one of which can be an I/O bus for the peripherals and one that directly connects the processor 120 and the memory 130 (often referred to as a memory bus). The buses are connected together through bridge components that perform any necessary translation due to differing bus protocols.

In addition, the computer system 100 is controlled by operating system software which includes a file management system, such as a disk operating system, which is part of the operating system software. One example of an operating system software with its associated file management system software is the family of operating systems known as Windows CE® and Windows® from Microsoft Corporation of Redmond, Wash., and their associated file management systems. Another example of operating system software with its associated file management system software is the LINUX operating system and its associated file management system. Another example of an operating system software with its associated file management system software is the PALM operating system and its associated file management system. The file management system is typically stored in the non-volatile storage 140 and causes the processor 120 to execute the various acts required by the operating system to input and output data and to store data in memory, including storing files on the non-volatile storage 140. Other operating systems may be provided by makers of devices, and those operating systems typically will have device-specific features which are not part of similar operating systems on similar devices. Similarly, WinCE® or PALM operating systems may be adapted to specific devices for specific device capabilities. Other examples include Google's ANDROID, Apple's IOS, Nokia's SYMBIAN, RIM's BALCKBERRY OS, Samsung's BADA, Microsoft's WINDOWS PHONE, Hewlett-Packard's WEBOS, and embedded Linux distributions such as MAEMO, MEEGO, and the like.

The computer system 100 may be integrated onto a single chip or set of chips in some embodiments, and typically is fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Figure 2:
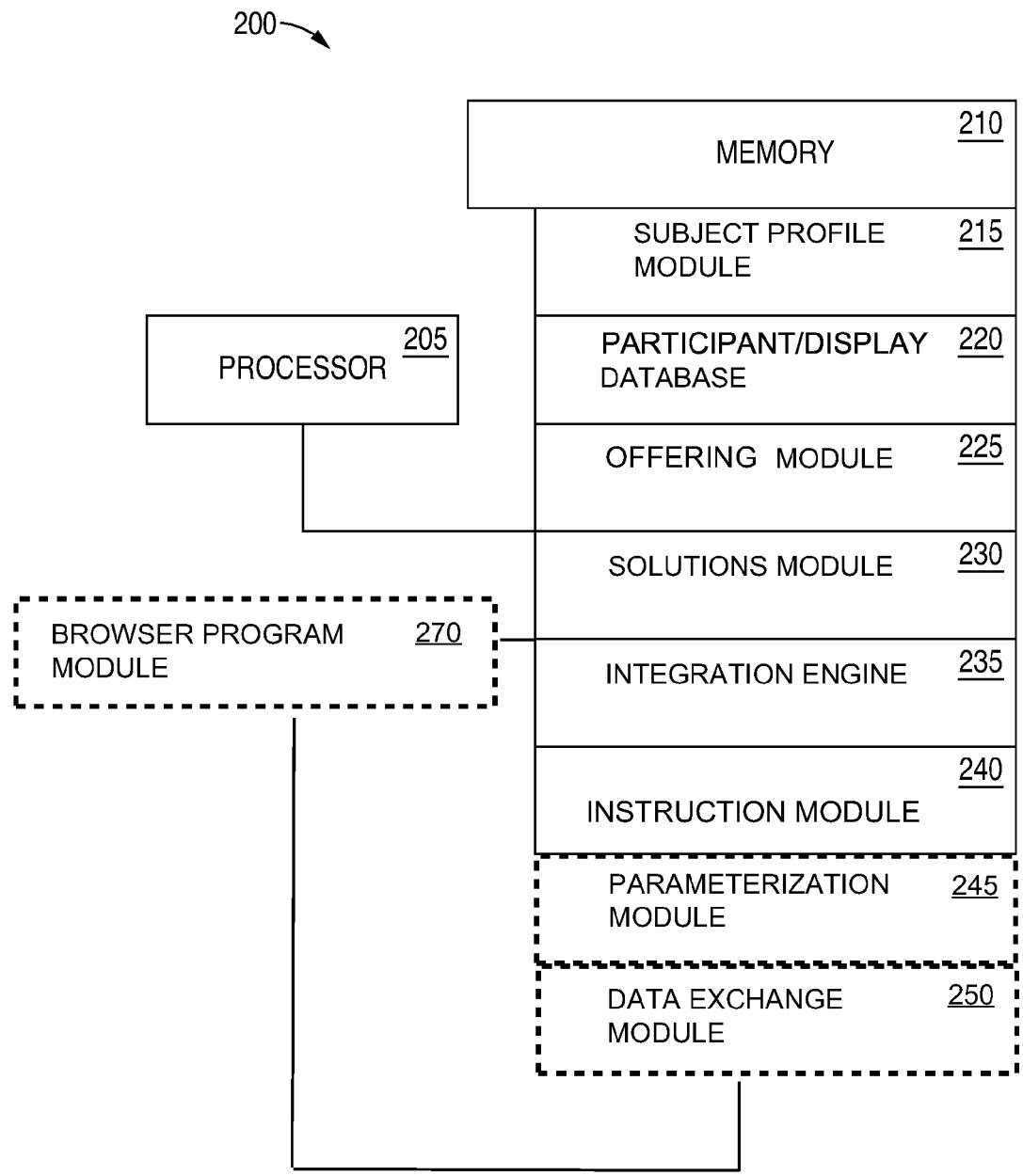
FIG. 2 illustrates a processor-memory diagram to describe components of a system, according to some embodiments.

FIG. 2 illustrates a processor-memory diagram to describe components of a system, according to some embodiments. The system 200 shown in FIG. 2 can include, for example, a processor 205 and a memory 210 (that can include non-volatile memory), wherein the memory 210 includes a subject-profile module 215, a participant/display database 220, an offering module 225, a solutions module 230, an integration engine 235, and an instruction module 240. And, as shown, other components can be included.

The system includes an input device (not shown) operable to allow a user to enter a personalized subject-profile into the computing system. Examples of input devices include a keyboard, a mouse, a data exchange module operable to interact with external data formats, voice-recognition software, a hand-held device in communication with the system, and the like.

The offering module 225 can be embodied in a non-transitory computer readable storage medium and operable for offering an opportunity to provide a display or other communication to the network community through a public venue. The instruction module 240 can be embodied in a non-transitory computer readable storage medium and operable for providing virtual instruction to a member of the network community (e.g., participant, virtual user, player/celebrity, and/or administrator) regarding a criteria for making a submission of any type, or interacting within the community in any way, through the public venue.

The participant/display database 220 can be embodied in a non-transitory computer readable storage medium and operable to store a library of past displays or other data regarding prior, present, or future events, wherein the database can include any text or any other media, including data compilations for participants, players or celebrities/entertainers, statistics, and the like, or whatever other information may be considered useful and entertaining to the network community.

The subject-profile module 215 can be embodied in a non-transitory computer readable storage medium and operable for receiving the personalized subject-profile and converting the personalized subject profile into a network user profile for any participant, virtual user, player/celebrity, and/or administrator. The network user profile can comprise a set of personal statistics for the user, along with a tracking of the user's participation in the network community, as well as data regarding the same, all of which can include an identification of a select player/celebrity, a select display, or a genre of events that may be of preference to any user at any given point in time. As such, this provides a way for users of similar interests to identify one another and target community groups, subgroups, and even one-on-one communications. The input device can allow a user to enter a personalized subject-profile into a computing system. And, the personalized subject-profile can comprise a questionnaire designed to obtain information to be used to produce a personalized file for the user.

The solutions module 230 can be embodied in a non-transitory computer readable storage medium and operable for parsing the participants, virtual users, players/celebrities, administrators, or users in any combination, as well as displays and other such data in the participant/display database. This information can be placed into separate categories for viewing in response to any user's selection of the player and the challenge. The integration engine 235 can be embodied in a non-transitory computer readable storage medium and operable for compiling information in any way desired by the system, method, or particular user or combination of users.

It should be appreciated that any of the modules or engines can have additional functions, and additional modules or engines can be added to further provide even more functionality. The integration engine 235 can also be used for identifying limits in the selection of displays, selection of users, and the like, as an automated pre-screening of the type and scope of displays that are allowable by the network community, whether the rules are established by a community, a group, or a subgroup, as well as by legal guidelines set-forth by one or more administrators. Of course, the system will have a processor 205. And, the graphical user interface (not shown) can be used for displaying video, audio, and/or text to the user.

Requests of any type, such as a request to offer a display to the network community, or a user-to-user or user-to-group communication, can be screened by the system using limit settings that follow rules. Such a limit can be referred to, in some embodiments, as a technical or preferential reason that a particular request may fall outside of a desired criteria. The screening can be a pre-screening process used to reduce a high number of submissions down to a practical number for review and, in some embodiments, the criteria can be widened or narrowed to harness a desired number, or type, of submissions. The pre-screening process can be a relatively simple function that, for example, screens for profanity, nudity, or violence; or, in some embodiments, it can be a relatively complex function that screens for particular details of interest, such as a flagged user identification, a correlation between a particular user and particular group, or the like, wherein the complex function can draw information on users from other public databases. It should be appreciated that the value of pre-screening cannot be overstated, as reviewing a high number of submissions, particularly on a mass scale, can provide a result that may be useful to the network community, the usefulness depending at least in part on the quality, relevance, and overall value of the compilation of submissions. An automated pre-screening to remove submissions through a select criteria, for example, could assist in making the mass screenings of submissions practical.

In some embodiments, the system further comprises a parameterization module operable 245 to derive select parameters such as, for example, display-preference parameters from the user profile, and the graphical user interface displays select data from the participant/display database 220 in accordance with the user's display preferences and in the form of the customized set of information subset options. Select parameters may include user selections, administrator selections, or some combination thereof. For example, the user may prefer a select combination of shapes, colors, sound, and any other of a variety of screen displays and multimedia options. Furthermore, the selections can be used to personalize and change the display-preference parameters easily and at any time.

In some embodiments, the system further comprises a data exchange module 250 operable to interact with external data formats, wherein the subject-profile comprises external participant/display data obtained from another database or source, such as a remote memory source, including any external memory or file known to one of skill, including other user databases within the network community.

In some embodiments, the system further comprises a messaging module (not shown) operable to allow users to communicate with other users having like subject-profiles, or others users in a profile independent manner, merely upon election of the user. The users can email one another, post blogs, or have instant messaging capability for real-time communications. In some embodiments, the users have video and audio capability in the communications, wherein the system implements data streaming methods known to those of skill in the art.

The systems taught herein can be practiced with a variety of system configurations, including personal computers, multiprocessor systems, microprocessor-based or programmable consumer electronics, network PCs, minicomputers, mainframe computers, and the like. The teachings can also be practiced in distributed computing environments where tasks are performed by remote processing devices that are linked through a communications network. As such, in some embodiments, the system further comprises an external computer connection and a browser program module 270. The browser program module 270 can be operable to access external data through the external computer connection.

Figure 3:
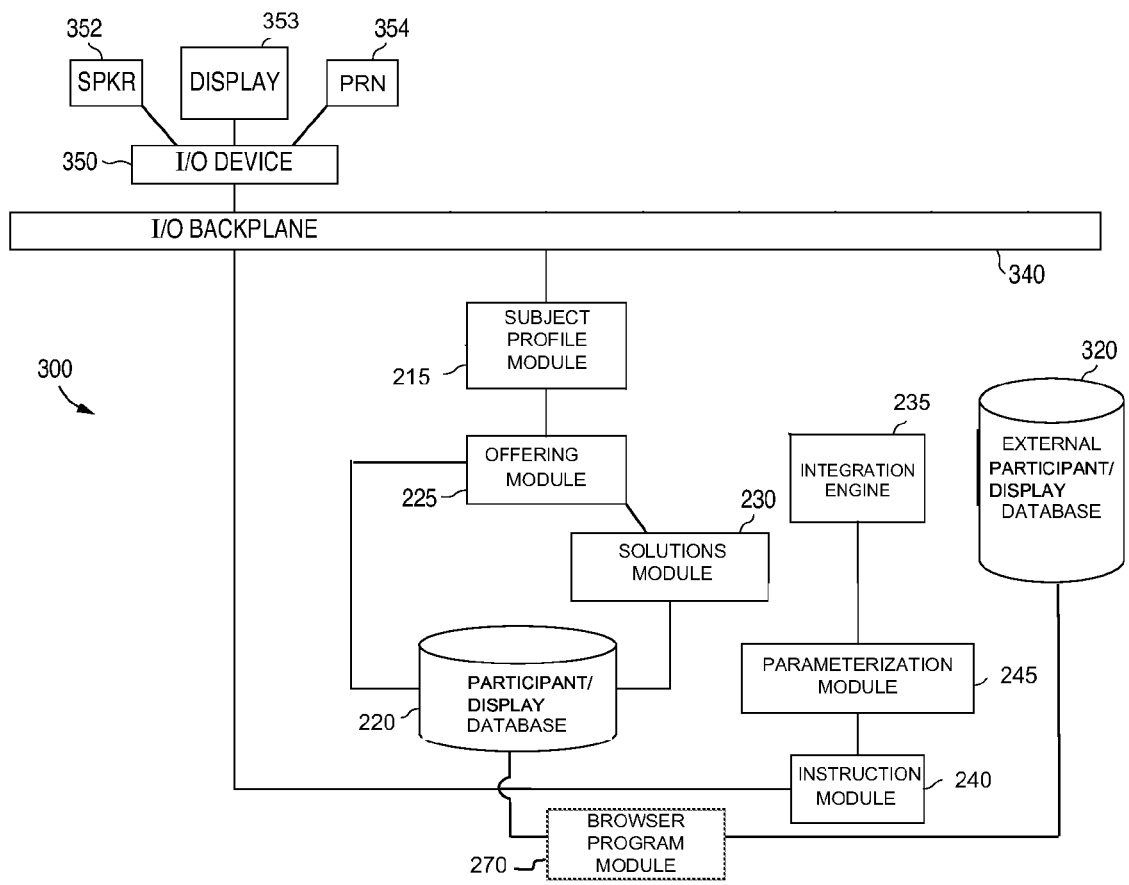
FIG. 3 is a concept diagram illustrating a system taught herein, according to some embodiments.

FIG. 3 is a concept diagram illustrating a system taught herein, according to some embodiments. The system 300 contains components that can be used in a typical embodiment. In addition to the subject-profile module 215, participant/display database 220, the offering module 225, the solutions module 230, the integration engine 235, and the instruction module 240 shown in FIG. 2, the memory 210 of the device 300 also includes parameterization module 245 and the browser program module 270 for accessing the external participant/display database 320. The system can include a speaker 352, display 353, and a printer 354 connected directly or through I/O device 350 connected to I/O backplane 340.

It should be appreciated that, in some embodiments, the system can be implemented in a stand-alone device, rather than a computer system or network, such that the device functions as a crown-sync system as provided herein, but does not perform any other substantially different functions. In figure FIG. 3, for example, the I/O device 350 connects to the speaker (spkr) 352, display 353, and microphone (mic) 354, but could also be coupled to other features. Other features can be added such as, for example, an on/off button, a start button, an ear phone input, and the like. In some embodiments, the system can turn on and off through motion.

In some embodiments, the systems can include security measures to protect the user's privacy, integrity of data, or both. And, the system can further comprise a response module embodied in a non-transitory computer readable storage medium for matching the user profile with the automated pre-screening to provide an automated status report to the user.

The teachings are also directed to a system for displaying a portion of a choreographed crowd media display. In these embodiments, the system comprises a processor; a graphical user interface; and, a choreography module embodied in a non-transitory computer readable storage medium for receiving and displaying a choreographed portion of a crowd media display to the graphical user interface of at least one of a plurality of participants attending an event, each of the plurality of participants having (i) a close-visual proximity to other participants; and, (ii) it's own respective computing device with a graphical user interface, a processor, a database embodied in a non-transitory computer readable storage medium, and a choreography module embodied in a non-transitory computer readable storage medium, the respective computing device operable to at least receive and display a respective choreographed portion of the crowd media display. And, in these embodiments, each of the choreographed portions can be configured to be received and displayed by the choreography module of each respective computing device within the plurality of participants in the crowd in a choreographed manner coordinated with an activity at the event. In this way, the system facilitates a participation by each of the plurality of participants that includes at least the experience of receiving and displaying it's respective choreographed portion of the crowd media display.

The teachings also include a system for displaying media in portions among independent users in a crowd setting in a choreographed manner. In these embodiments, the system comprises a shared processor; a shared database embodied in a non-transitory computer readable storage medium for storing a choreographed crowd media display in portions for distribution, respectively, to each of a plurality of participants attending an event; and, a shared distribution engine embodied in a non-transitory computer readable storage medium for distributing the choreographed crowd media in the respective portions to each of the plurality of participants attending the event. In these embodiments, the system also includes a first computing device having first processor; a first graphical user interface; and, a first choreography module embodied in a non-transitory computer readable storage medium for receiving and displaying a first media display to the first graphical user interface of a first participant within the plurality of participants; wherein, the first media display is a first portion of the choreographed crowd media display. And, in order to have a plurality, these systems also include a second computing device having a second processor; a second graphical user interface; and, a second choreography module embodied in a non-transitory computer readable storage medium for receiving and displaying a second media display to the second graphical user interface of a second participant within the plurality of participants; wherein, the second media display is a second portion of the choreographed crowd media display. And, in most embodiments, the systems can include an $n^{th}$ computing device having an $n^{th}$ processor; an $n^{th}$ graphical user interface; and, an $n^{th}$ choreography module embodied in a non-transitory computer readable storage medium for receiving and displaying an $n^{th}$ media display to the $n^{th}$ graphical user interface of an $n^{th}$ user within the plurality of participants; wherein, the $n^{th}$ media display is an $n^{th}$ portion of the choreographed crowd media display; wherein, n ranges from 3 to the total number of participants attending the event; and, each of the plurality of participants are offered an experience at the event that includes participating with the activity of the event, the experience including at least receiving and displaying it's respective choreographed portion of the crowd media display.

Figure 4:
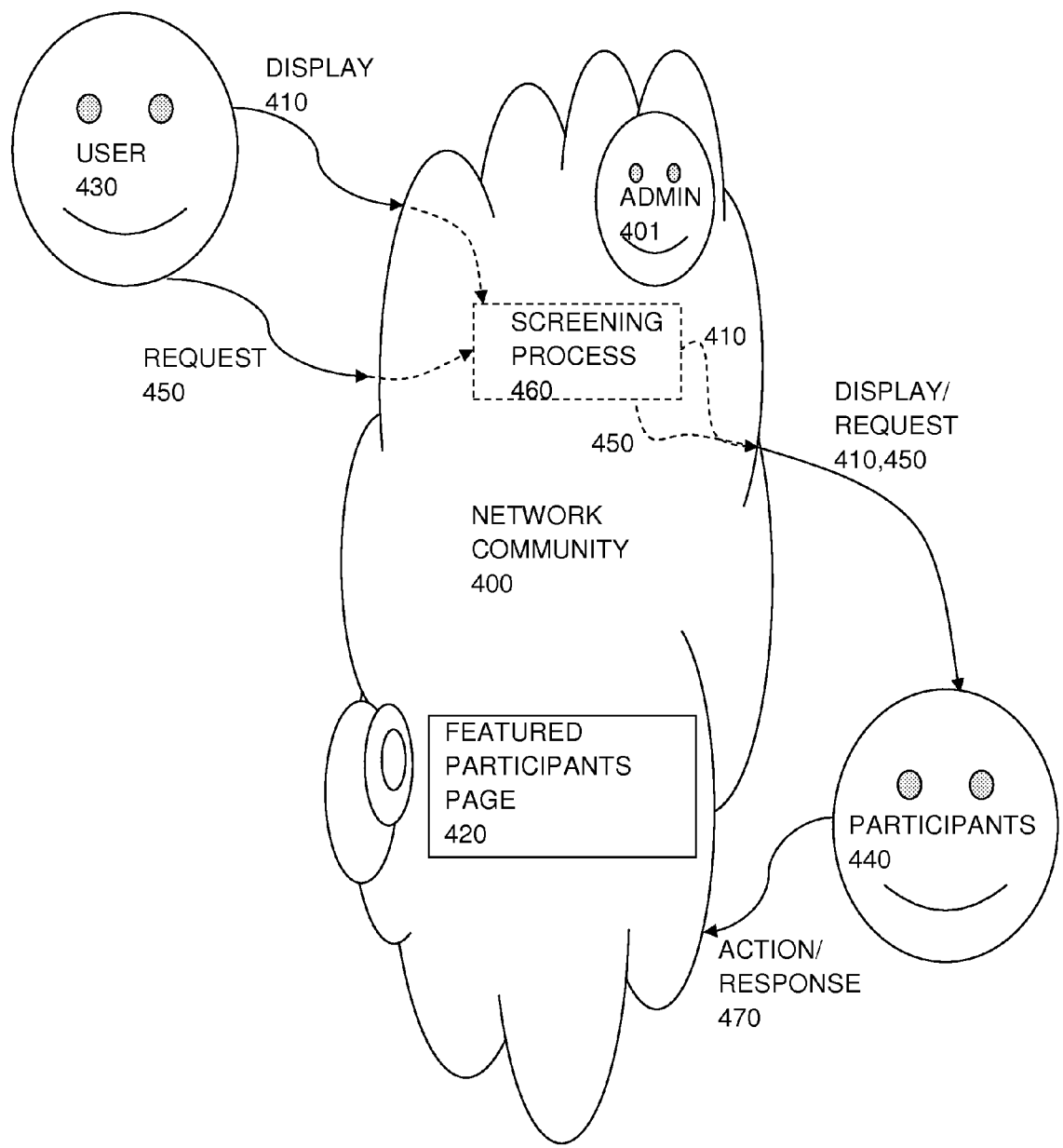
FIG. 4 illustrates how the systems and methods taught herein can function in a crowd-sync setting, according to some embodiments.

FIG. 4 illustrates how the systems and methods taught herein can function in a crowd-sync setting, according to some embodiments. A user 430 of the network community 400, can post a display 410 which could be posted with a set of specific, or proposed, instructions for a plurality of participants 440 in the network community 400, which may include a desired action requested by the plurality of participants (or an individual participant or subset of participants in some embodiments) 440, each of which can be chosen or modified by the network community 400 or the administrator 401 for the network community 400, explaining what performance is expected or desired by the network community 400 from a participant 440 before the participants 440 can receive a display or offer of display from the user 430.

In some embodiments, the network community 400 can limit the participants 440 that are offered the display 410, listing the available participants 440 on a featured participants page 420. It should be appreciated that the displays 410 and/or participants 440 can be obtained from another source or external database, a source other than the participant/display database, for example, a database used in a centralized manner by the network community 400. In some embodiments, such players/challenges can be made available from a remote server or memory at which a part of the network community 400 has independently stored their own participant/display data.

A user 430 can access the featured participants page 420 or featured display page (not shown) through the network community server, for example, and download the data to their local computer. And, a user 430 can communicate with the network community 400 or a participant 440 upon request 450. A player 440, or a network community administrator 401, for example, can review each request 450 and decide whether to facilitate such communications with the user 430. An automatic screening process 60 can also be used to ensure that any proposed subject matter for display meet a selected criteria of the network community. Such criteria can include content criteria, such as safety criteria, morality criteria, and any other imaginable subject matter criteria that can be established and enforced by the network community.

Other review simplifications can be used to bring practicality into the review of submissions from members of the network community. For example, it should be appreciated that a substantial percentage of submissions may fall outside of the standards for an acceptable submission. Any set of standards may be used to reject submissions. In some embodiments, the automated screening process 460 can be used to automatically reject submissions for a variety of reasons, for example, where such submissions fall outside a predefined threshold level for the type and scope of a display challenge, such as a legal or network community constraint as described herein. The screening process 460 may also send a notice to the submitting party to request a correction within a specified time frame, for example, or possibly indicate that their submission has been rejected without an opportunity for cure. In these embodiments, for example, submissions that do not meet the predefined level threshold level for the type and scope of submission can also be automatically normalized within the screening process 460 by removing disallowed constraints and automatically modifying the submission with or without sending the modification to the member that sent the submission.

After screening, review, and selection of a participant or display, the system and/or the network administrator can make a final compilation of all considered participants 440 and displays 410 for posting in the network community 400. Once the participant 440 and the display 410 is posted and released, and the participants 440 respond and experience the crowd-sync activity by, perhaps, performing an action 470 at the event. It should be appreciated that the "action" can be any response of a participant to a display, for example, shouting, singing, dancing, any one or combination of body movements, reading a display, broadcasting a display, and the like. In some embodiments, the action 470 includes moving the handheld device, perhaps to a rhythm, in sync with the crowd. The accelerometer in the handheld device, for example, can perform a variety of functions including, but not limited to, triggering a response to the network community that shows a number of responders, or some other activity level of the responders in the plurality of participants.

Systems can be configured for virtual users that are not attending the event in-person but, rather, virtually through a network connection. In some embodiments, the methods and systems taught herein can further comprise a choreography module for a virtual user having a virtual presence at the event through a network connection. In these embodiments, the system can include a choreography module embodied in a non-transitory computer readable storage medium for receiving and displaying a choreographed portion of a crowd media display to the graphical user interface of the virtual user; wherein, the choreographed portion can be configured to be received and displayed by the virtual user in a choreographed manner coordinated with an activity at the event, facilitating a participation by the virtual user with the crowd that includes at least receiving and displaying it's respective choreographed portion of the crowd media display.

In some embodiments, the methods and systems taught herein further comprise a social networking functionality. In these embodiments, the computing devices can have a social networking module on a non-transitory computer readable medium for receiving and sending a social networking media to the respective graphical user interface, the social networking media comprising a component selected from the group consisting of a user-created marketplace display, a user-specific group display, a user-publicized event display, a user-customized public page display, a user-presence and chat display, and a combination thereof.

Figure 5:
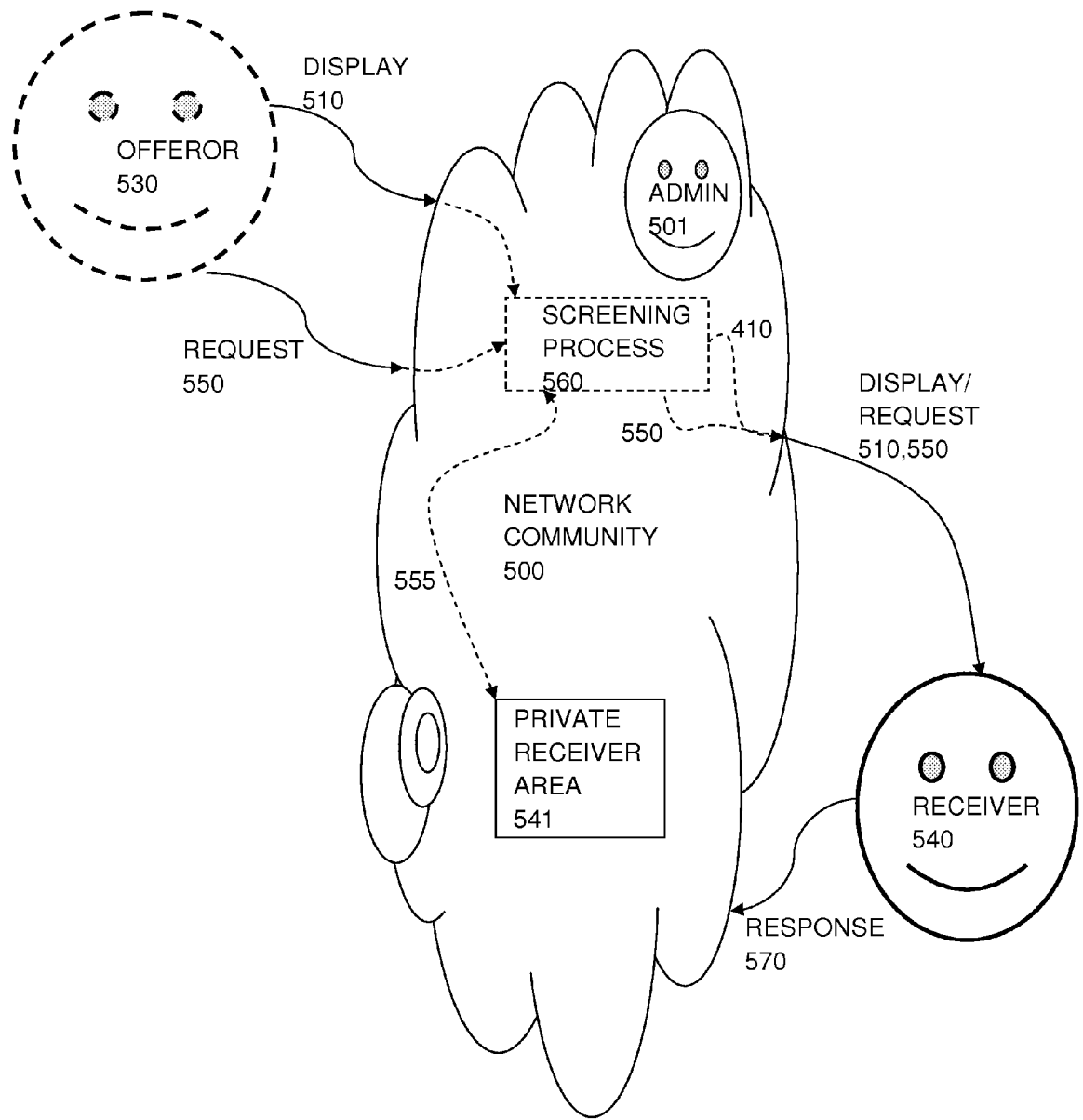
FIG. 5 illustrates the system from the perspective of a participant, according to some embodiments.

FIG. 5 illustrates the system from the perspective of a participant, according to some embodiments. In some embodiments, users of the systems and methods herein include a participant offering a display ("offeror") and a participant receiving a display ("receiver"). An offeror 530 can offer or request 550 a display 510 with the network community 500, with or without a set of specific instructions explaining what is expected of the receiver 540 upon receipt of the display 510.

In some embodiments, each user 530,540 can have a dedicated private receiver area 541 on a server within the network community 500 that is specific and compartmentalized for the user's account. An offeror 530, for example, can request 550 access to the receiver 540 through the private receiver area 541, subject to screening 560, and discuss 555 a display 510 or any other topic with the receiver 540 in the network community 500, and the discussion 555 can be private to the offeror 530 and receiver 540 until the discussion 555 is complete and, the display 510 is received. When the discussion 555 is complete, the network community can also view the display 510. Upon a response 570 by the receiver 540, the users 530,540 participate with the crowd and have the crowd-sync experience. In some embodiments, the offeror can have an open forum discussion that includes interaction among all potential receivers.

Figure 6:
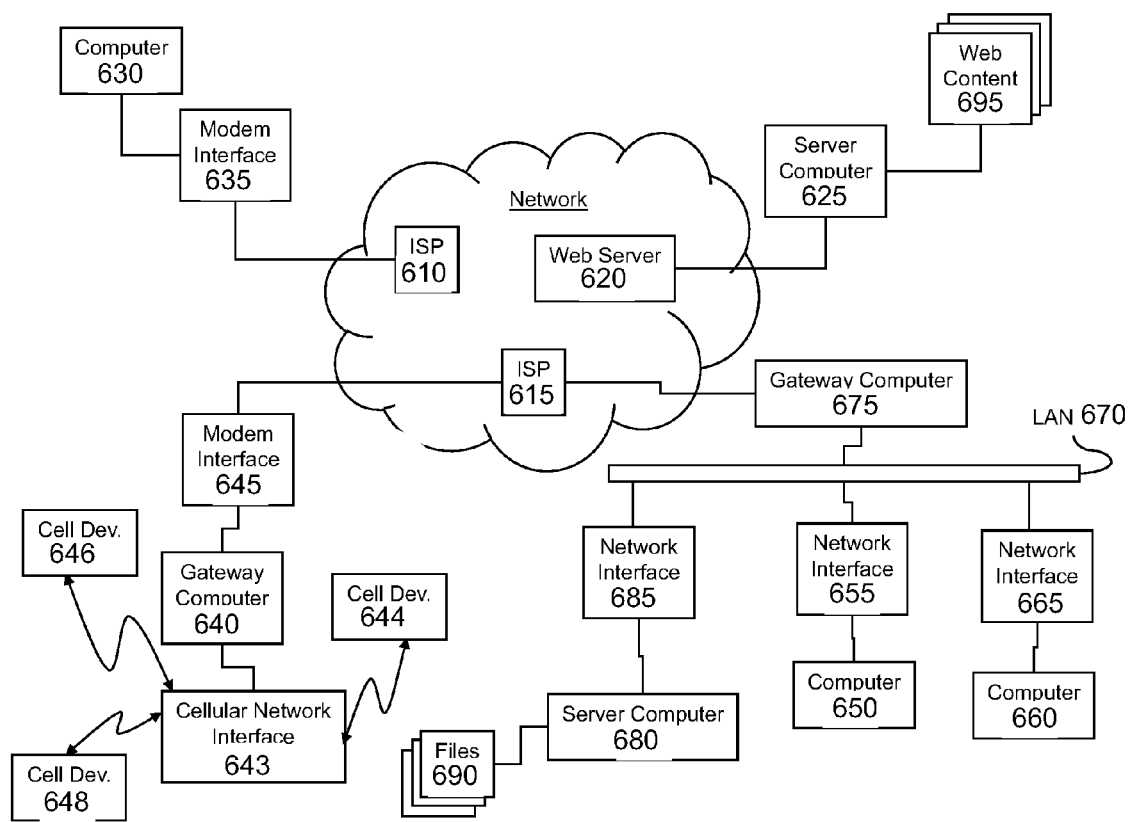
FIG. 6 shows how a network may be used for the systems and methods taught herein, in some embodiments.

FIG. 6 shows how a network may be used for the systems and methods taught herein, in some embodiments. FIG. 6 shows several computer systems coupled together through a network 605, such as the internet, along with a cellular network and related cellular devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 605 is typically provided by internet service providers (ISP), such as the ISPs 610 and 615. Users on client systems, such as client computer systems 630, 650, and 660 obtain access to the internet through the internet service providers, such as ISPs 610 and 615. Access to the internet allows users of the client computer systems to exchange information, receive and send e-mails, and view documents, such as documents which have been prepared in the HTML format, for example. These documents are often provided by web servers, such as web server 620 which is considered to be "on" the internet. Often these web servers are provided by the ISPs, such as ISP 610, although a computer system can be set up and connected to the internet without that system also being an ISP.

In some embodiments, the system is a web enabled application and can use, for example, Hypertext Transfer Protocol (HTTP) and Hypertext Transfer Protocol over Secure Socket Layer (HTTPS). These protocols provide a rich experience for the end user by utilizing web 2.0 technologies, such as AJAX, Macromedia Flash, etc. In some embodiments, the system is compatible with Internet Browsers, such as Internet Explorer, Mozilla Firefox, Opera, Safari, etc. In some embodiments, the system is compatible with mobile devices having full HTTP/HTTPS support, such as IPHONE, ANDROID, SAMSUNG, POCKETPCs, MICROSOFT SURFACE, video gaming consoles, and the like. Others may include, for example, IPAD and ITOUCH devices. In some embodiments, the system can be accessed using a Wireless Application Protocol (WAP). This protocol will serve the non HTTP enabled mobile devices, such as Cell Phones, BLACKBERRY devices, etc., and provides a simple interface. Due to protocol limitations, the Flash animations are disabled and replaced with Text/Graphic menus. In some embodiments, the system can be accessed using a Simple Object Access Protocol (SOAP) and Extensible Markup Language (XML). By exposing the data via SOAP and XML, the system provides flexibility for third party and customized applications to query and interact with the system's core databases. For example, custom applications could be developed to run natively on APPLE devices, JAVA or .Net-enabled platforms, etc. One of skill will appreciate that the system is not limited to any of the platforms discussed above and will be amenable to new platforms as they develop.

The web server 620 is typically at least one computer system which operates as a server computer system and is configured to operate with the protocols of the world wide web and is coupled to the internet. Optionally, the web server 620 can be part of an ISP which provides access to the internet for client systems. The web server 620 is shown coupled to the server computer system 625 which itself is coupled to web content 695, which can be considered a form of a media database. While two computer systems 620 and 625 are shown in FIG. 6, the web server system 620 and the server computer system 625 can be one computer system having different software components providing the web server functionality and the server functionality provided by the server computer system 625 which will be described further below.

Cellular network interface 643 provides an interface between a cellular network and corresponding cellular devices 644, 646 and 648 on one side, and network 605 on the other side. Thus cellular devices 644, 646 and 648, which may be personal devices including cellular telephones, two-way pagers, personal digital assistants or other similar devices, may connect with network 605 and exchange information such as email, content, or HTTP-formatted data, for example. Cellular network interface 643 is coupled to computer 640, which communicates with network 605 through modem interface 645. Computer 640 may be a personal computer, server computer or the like, and serves as a gateway. Thus, computer 640 may be similar to client computers 650 and 660 or to gateway computer 675, for example. Software or content may then be uploaded or downloaded through the connection provided by interface 643, computer 640 and modem 645.

Client computer systems 630, 650, and 660 can each, with the appropriate web browsing software, view HTML pages provided by the web server 620. The ISP 610 provides internet connectivity to the client computer system 630 through the modem interface 635 which can be considered part of the client computer system 630. The client computer system can be, for example, a personal computer system, a network computer, a web TV system, or other such computer system.

Similarly, the ISP 615 provides internet connectivity for client systems 650 and 660, although as shown in FIG. 6, the connections are not the same as for more directly connected computer systems. Client computer systems 650 and 660 are part of a LAN coupled through a gateway computer 675. While FIG. 6 shows the interfaces 635 and 645 as generically as a "modem," each of these interfaces can be an analog modem, isdn modem, cable modem, satellite transmission interface (e.g. "direct PC"), or other interfaces for coupling a computer system to other computer systems.

Client computer systems 650 and 660 are coupled to a LAN 670 through network interfaces 655 and 665, which can be ethernet network or other network interfaces. The LAN 670 is also coupled to a gateway computer system 675 which can provide firewall and other internet related services for the local area network. This gateway computer system 675 is coupled to the ISP 615 to provide internet connectivity to the client computer systems 650 and 660. The gateway computer system 675 can be a conventional server computer system. Also, the web server system 620 can be a conventional server computer system.

Alternatively, a server computer system 680 can be directly coupled to the LAN 670 through a network interface 685 to provide files 690 and other services to the clients 650, 660, without the need to connect to the internet through the gateway system 675.

Through the use of such a network, for example, the system can also provide an element of social networking, whereby users can contact other users having similar subject-profiles, or user can contact anyone in the public to forward the personalized information. In some embodiments, the system can include a messaging module operable to deliver notifications via email, SMS, TWITTER, FACEBOOK, LINKEDIN, and other mediums. In some embodiments, the system is accessible through a portable, single unit device and, in some embodiments, the input device, the graphical user interface, or both, is provided through a portable, single unit device. In some embodiments, the portable, single unit device is a handheld device.

It should be appreciated that any computing device, whether or not having any other substantial purpose, can be used. In some embodiments, the computing devices include a handheld device having no other substantial purpose. In some embodiments, the computing devices include a personal computer (PC), or perhaps a handheld device such as, for example, a cell phone, a smart phone, a PDA, a laptop, an APPLE iPAD, a GOOGLE NEXUS tablet, AMAZON KINDLE FIRE, and the like. In some embodiments, for example, the computing devices in the plurality of participants include any combination of one or more handheld devices, and the sending or receiving of the crowd media display can be controlled by a motion of the one or more handheld devices. In some embodiments, the computing device of a virtual user, for example, can often be a personal computer (PC).

It should also be appreciated that any event having a plurality of participants can be the environment in which the methods and systems taught herein provide the experience. In some embodiments, the event is an entertainment event, a media event, a bidding event, a voting event, or a combination thereof.

It should also be appreciated that any one, or any combination of, media can be displayed. The media can be delivered to participants/virtual users in any combination, in series as a random or systemic happening, or perhaps in unison, for example, using the methods and systems taught herein. In some embodiments, the choreographed crowd media display includes audio, video, text, or a combination thereof. And, in some embodiments, the choreographed crowd media display occurs among the plurality of participants/virtual users in any combination, in series as a random or systemic happening, or perhaps in unison, for example, susing the methods and systems taught herein.

It should also be appreciated that any participant/virtual user can control an offering of a media display. The offering can also be controlled from central location that is not a participant or virtual user but, rather, as a producer, director, or other dedicated administrator. In some embodiments, an administrative user is included in the methods and systems taught herein, and the offering and/or sending is controlled by the administrative user. For example, in some embodiments, the choreography module, shared or independent, can be configured to include an administrative function to facilitate an offering of the choreographed crowd media display to the plurality of participants.

It should also be appreciated that any number of participants that could be envisioned in a crowd gathering can experience the methods and systems taught herein. In some embodiments, the plurality of participants comprises at least 1000 participants. And, in some embodiments, the plurality of participants can range from about 10 to about 100,000, from about 100 to about 10,000, from about 1000 to about 50,000, from about 2000 to about 5000, including at least 10, at least 100, at least 500, at least 1000, at least 2000, at least 3000, at least 5000, at least 10,000, at least 15,000, at least 20,000, at least 25,000, at least 30,000, at least 50,000, at least 100,000, any range of participants therein, or any number of participants therein in increments of 10.

The system and its information database can also include any of a variety of system libraries that contain organized sets of any of a variety of information of value to users, in some embodiments. Moreover, information can be obtained from external data sources, whereby plug-ins and APIs can be designed to allow integration with third party systems and exchange data with external data sources. The external data sources can be used to provide information on demand, to update existing information stored in the system libraries, or both.

In some embodiments, the system contains an engine operable to create and optimize content for users. The engine can integrate information from other modules, as well as human inputs, e.g. from administrators and user interactions, and produces an optimized presentation for the user. In some embodiments, the engine can learn about the user through continued use, wherein the data collection algorithms and methods are modified to correlate with, for example, a user's types and frequencies of choices and answers. Relationships between the choices and answers can be structured to match the subject-profile, in some embodiments. In these embodiments, the engine starts with proprietary generic rules and algorithms, and these rules and algorithms continue to be refined as the system collects information and learns from the user and his/her interactions. Accordingly, the system can have the capability of providing a unique insight to marketing data.

Some portions of the teachings are presented in terms of operations of the system. The operations are those requiring physical manipulations, transformations of matter, of physical quantities resulting in a useful product being produced. Usually, though not necessarily, these quantities take the form of data capable of being stored, transferred, combined, compared, and otherwise manipulated. It has proven convenient at times, principally for reasons of common usage, to refer to these signals as bits, values, elements, symbols, characters, terms, numbers, or the like. All of these and similar terms are to be associated with the appropriate physical quantities and are merely convenient labels applied to these quantities. Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the teachings relate to a system for performing the operations herein. This system may be specially constructed as an apparatus designed solely for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. It should be appreciated, however, the teachings include computing in a cloud environment where part, if not all, of the media and applications are available in the cloud and are merely accessed by the user from a remote location or device. Likewise, all or part of the media and applications can be obtained as files that operate independent of an internet bandwidth or cloud system, for example, and operated remotely, privately, and locally by the user or the reviewer.

It should be also appreciated that the methods and displays presented herein, in some embodiments, are not inherently related to any particular computer or other apparatus, unless otherwise noted. Various general purpose systems may be used with programs in accordance with the teachings herein, or it may prove convenient to construct a specialized apparatus to perform the methods of some embodiments. The required structure for a variety of these systems will be apparent to one of skill given the teachings herein. In addition, the techniques are not described with reference to any particular programming language, and various embodiments may thus be implemented using a variety of programming languages. Accordingly, the terms and examples provided above are illustrative only and not intended to be limiting; and, the term "embodiment," as used herein, means an embodiment that serves to illustrate by way of example and not limitation. The following examples are illustrative of the uses of the present invention. It should be appreciated that the examples are for purposes of illustration and are not to be construed as limiting to the invention.

Example 1

An Implementation of Time-Sync for a Plurality of Participants at an Event

A system was developed by synchronizing time through a server having a reliable time variable. In an early version, a handshake mechanism was used to establish a synchronization between devices and a server.

Figure 7:
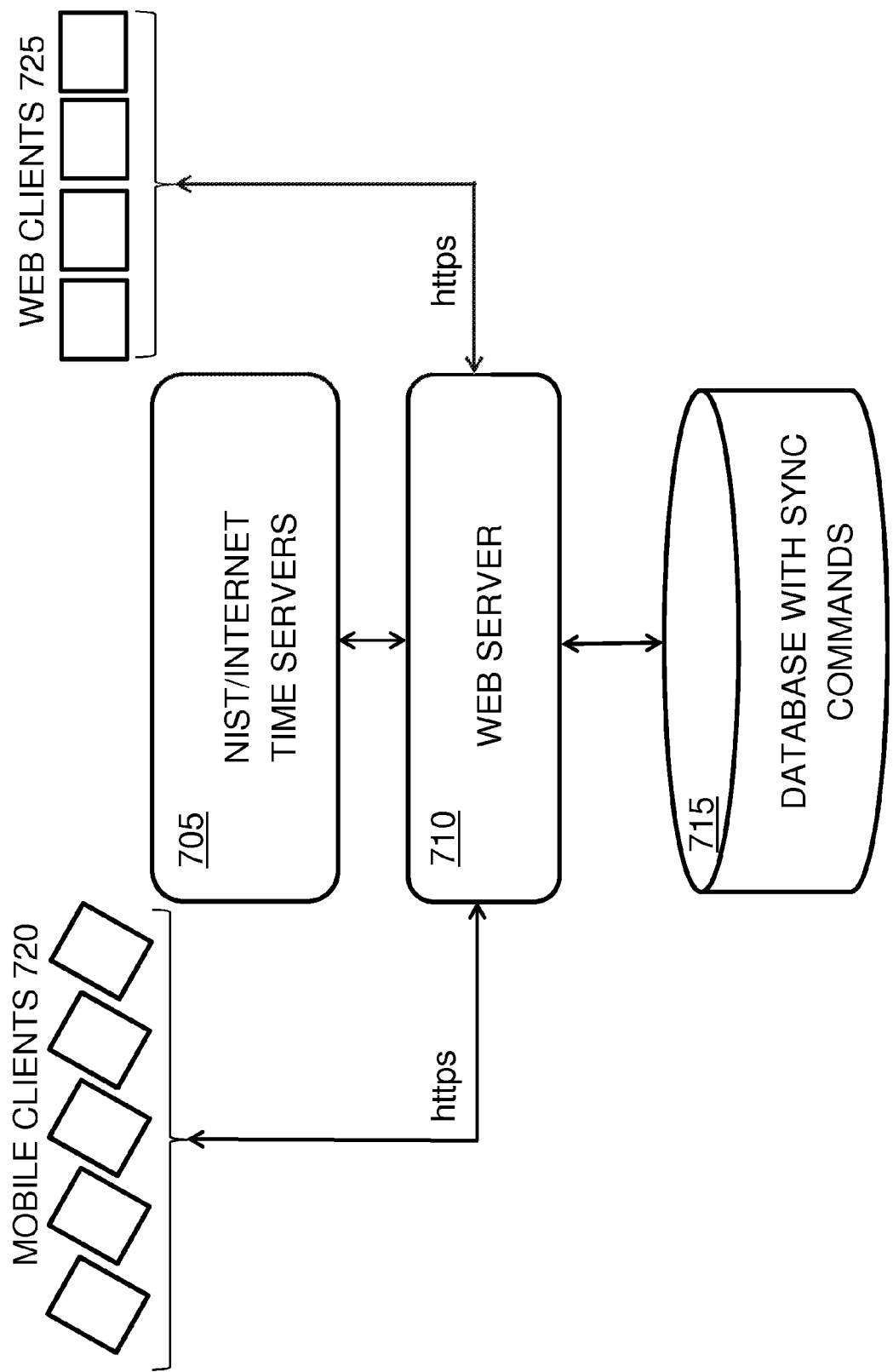
FIG. 7 illustrates the use of a handshake mechanism that allowed for time synchronization in a client/server model, according to some embodiments.

FIG. 7 illustrates the use of a handshake mechanism that allowed for time synchronization in a client/server model, according to some embodiments. For example, a web server 710 can be configured to operably communicate with web clients 725 and/or mobile clients 720 using, for example, https. The web server 710 can also be configured to operably communicate with NIST/INTERNET time servers 705 and a database with sync commands 715.

The handshake mechanism allowed for a time synchronization in a client/server model, where the "clients" were mobile phone devices and the "server" was a web-based server that provided basic sync commands and a reliable time variable. The synchronization was initiated during sign-in and, at that moment, each client queried the server for the current time. Using JAVASCRIPT, the delta from each phone's on-board clock was calculated. This handshake was repeated 15 times over the course of roughly 10 seconds. The network latency issues were reduced to a minimum by accepting only the smallest delta from the handshake sampling. In some embodiments, the delta is less than about 0.050 seconds, less than about 0.10 seconds, or less than about 0.25 seconds. In some embodiments, the delta can range from about 0.050 seconds to about 0.50 seconds, from about 0.075 seconds to about 0.30 seconds, from about 0.10 seconds to about 0.25 seconds, from about 0.150 seconds to about 0.20 seconds, from about 0.050 seconds to about 0.15 seconds, from about 0.15 seconds to about 0.25 seconds, or any range therein in increments of 0.05 seconds. When sync'ing a cheer, for example, the importance of having a low delta is more readily recognized than when sync'ing a strobe, for example. It should be appreciated that when sync'ing a strobe, a participant can tolerate a higher delta value and still achieve an operable effect, an effect that provides the participant with an entertaining crowd experience.

One of skill will appreciate that the file size that can be sent to participants in the operation of the system can vary depending on the application. In some embodiments, the file size can vary from about 1 kb to about 1 GB, from about 10 kb to about 0.5 GB, from about 100 kb to about 0.25 GB, from about 200 kb to about 1 GB, from about 300 kb to about 1 GB, from about 400 kb to about 0.5 GB, from about 500 kb to about 1 GB, from about 600 kb to about 1 GB, from about 750 kb to about 1 GB, from about 1 kb to about 10 kb, from about 1 kb to about 20 kb, from about 1 kb to about 30 kb, from about 1 kb to about 40 kb, from about 1 kb to about 50 kb, from about 1 kb to about 100 kb, or any range therein in increments of 1 kb. In some embodiments, the file size can be <200 kb range. And, in some embodiments, the file size will be large enough to allow the system to sync a streamed video to participants. In some embodiments, a video stream can contain sufficient digital information to play for about 1 second to about 1 minute, for about 1 second to about 45 seconds, for about 1 second to about 30 seconds, for about 1 second to about 15 seconds, for about 1 second to about 10 seconds, for about 5 seconds to about 5 minutes, for about 5 seconds to about 3 minutes, for about 5 seconds to about 2 minutes, or any range therein in increments of 1 second. In some embodiments, a video stream can contain sufficient digital information to play for greater than about 1 minute, about 1 minute to about 1 hour, about 5 minutes to about 45 minutes, for about 10 minutes to about 30 minutes, for about 15 minutes to about 20 minutes, for about 5 minutes to about 15 minutes, or any range therein in increments of 1 minute.

The delta stored on each client device was used to calculate the trigger moment on a phone-by-phone basis to synchronize all devices. At that point, again using JavaScript, the phones "waited" for the trigger time and then executed the requested sync command.

For timed events that request or offer the plurality of participants to act together at a certain time, for example (perhaps an offer or request made to "fire strobes at 4:00 PM"), it was very effective and useful. It was also useful in environments where cell connectivity is spotty and wireless connectivity is non-existent.

This approach, while useful, made it difficult to offer spontaneous synchronized activities. To provide additional features, we can use connectivity to the web either through cell towers near an event or through wireless access points within a stadium. Having such connectivity allows us to use WEBSOCKETS.

Example 2

An Implementation of Time-Sync for a Plurality of Participants at an Event

A system was developed using connectivity to the web either through cell towers near an event or through wireless access points within a stadium.

Figure 8:
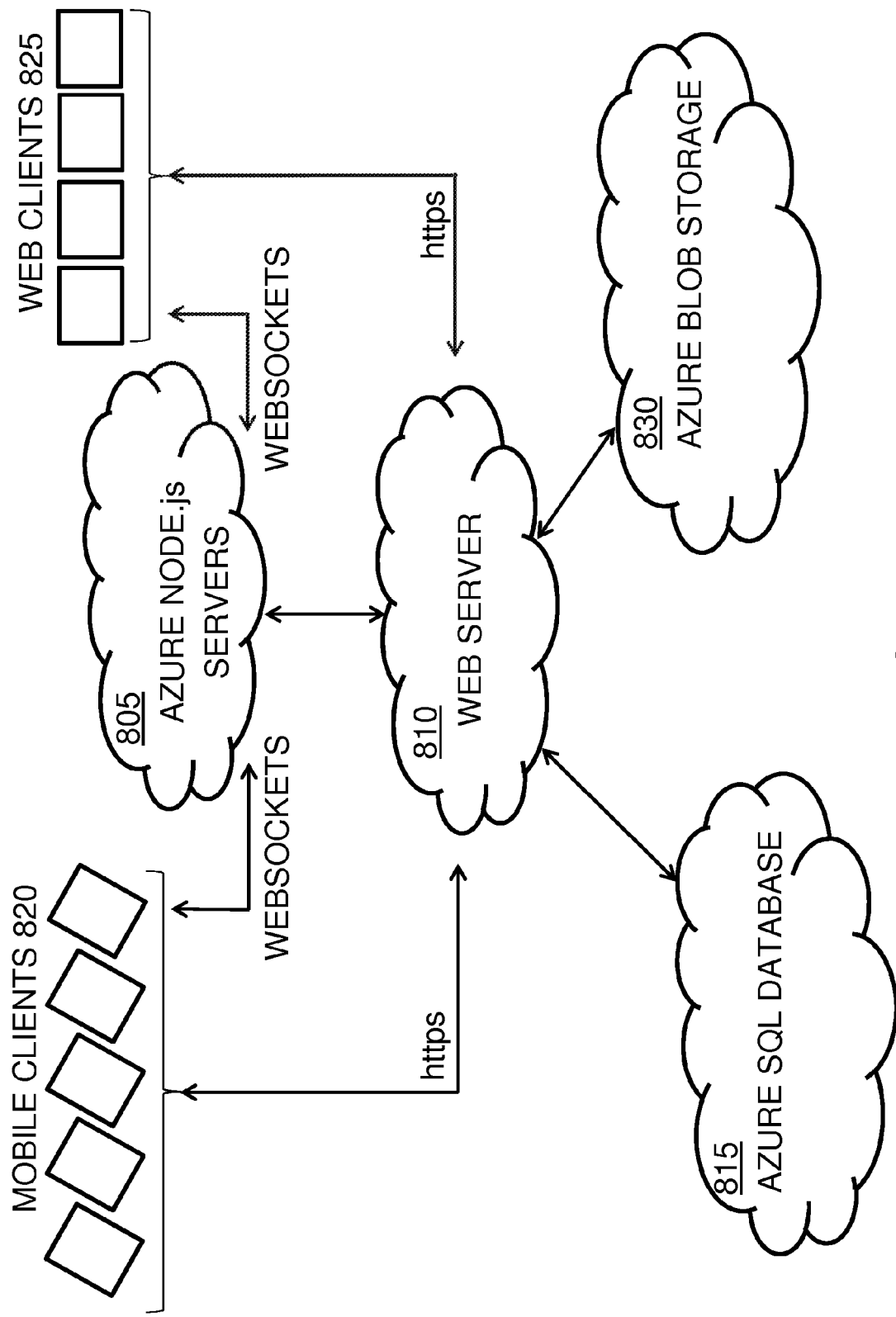
FIG. 8 illustrates an approach that uses WEBSOCKETS to provide a bi-directional, full-duplex communication between a client and server over a TCP connection, according to some embodiments.

FIG. 8 illustrates an approach that uses WEBSOCKETS to provide a bi-directional, full-duplex communication between a client and server over a TCP connection, according to some embodiments. For example, a web server 810 can be configured to operably communicate with web clients 825 and/or mobile clients 820 using, for example, https. The web server 810 can also be configured to operably communicate with AZURE node.js servers 805, an AZURE SQL database 815 and an AZURE BLOB storage 830.

With basic connectivity established, the systems and methods taught herein can be used to contact mobile devices on-demand once the user has checked-in to an event. This feature provides "spontaneous contact," which allows the systems to push data to the clients when events change, or sync commands are triggered, by any user, whether a participant, virtual user, player/celebrity, administrator, or the like. Such user's can include, for example, fans at a sporting event, or perhaps even team/event representatives.

On the server-side, the platform can leverage, for example, the tools and resources available in the Microsoft AZURE cloud. In some embodiments, the WEBSOCKET implementation can leverage:

1) Node.js servers that handle all sync commands. These servers can be used to manage the bi-directional communication for, conceivably, tens of thousands of fans signed into hundreds of events simultaneously. Every event can have a unique ID allowing the node servers to properly broadcast the correct sync command to users at a specific event. JavaScript code, for example, can be used to build this application.

2) AZURE Storage containers which store all images and videos that are captured by fans at an event. Given the bandwidth, these visual assets can be immediately broadcast to all clients that are connected to the node servers. These storage containers also hold sounds (mp3s) that can be downloaded to mobile devices prior to a sound sync command.

3) an AZURE SQL Database which is responsible for tracking all data flowing to and from the node servers in addition to the data moving via the systems and methods taught herein. This database was designed specifically for the systems and methods taught herein and contains chants, strobe definitions (colors by team), sound definitions, motion definitions, event data, user data, and a variety of other tables and procedures that manage friend relationships and meet-up functionality.

On the client-side, one of skill will also appreciate the applicability of using the following, and their equivalents, based on device-specific requirements to implement user interfaces:

1) IOS development for the (PHONE and IPAD using XCODE, OBJECTIVE-C and WEBSOCKETS.

2) ANDROID development using the XAMARIN platform and the .Net System. Net. Sockets library.

3) Windows mobile development using the XAMARIN platform and the .Net System.Net.Sockets library.

4) Web development using HTML, CSS, JAVASCRIPT, and the .Net development tools.

Example 3

A Smart-Strobe Feature for a Plurality of Participants at an Event

A system can be developed for a user to experience the opportunity to display a strobe from a handheld device at an event.

In this application, a user can select teams of interest, for example, upon signing in to the systems taught herein. The user's interface can show a list of the chosen teams when registration is complete. When the user chooses a specific team under the strobe feature of the application, the user's interface shows a color associated with that team and a start button. When user triggers the strobe, the chosen color flashes rapidly. The speed of the strobe and the duration of the strobe can be selected by the user in the settings features of the application.

In some embodiments, the user chooses a specific team and attends an event of that team. The strobe can be activated automatically, or the user can be given the option of "activating" their strobe experience. The strobe can be controlled by a single source with admin rights (an administrator) and all users can "opt-in" or "opt-out". Users that opt-in agree to have their strobe feature triggered by the administrator. When the administrator triggers a strobe, the users are given a brief warning, perhaps through a bell or a vibration on their mobile device, and/or a message appears on their screens. Several seconds after the warning (also adjustable in some embodiments by the user and/or administrator), all users devices trigger the strobe, in unison, in series, or some combination of unison and series strobes. The strobes can be coordinated, choreographed in any manner, either to be identical and in perfect sync, or to interact in some other planned fashion such as different colors in different sections, playing off each other.

Example 4

A Live Cheer Feature for a Plurality of Participants at an Event

A system can be developed for a user to experience the opportunity to cheer with the crowd in a choreographed manner in response to a display from a handheld device at an event.

In this example, the systems and methods taught herein can be used to choreograph a crowd response at an event. A network community can be organized to collaborate on various cheers, chants and heckles. On site at an event, a single user can be given admin rights and can choose to trigger a cheer. The cheer can be an offer for users, or automatically displayed to the plurality of participants, optionally subject to prescreening by the system. After the triggering of the cheer, the participants are given a brief warning (also adjustable in delay time, consistent with the teachings herein), through some notification feature on their mobile device, such as a ring or vibration, and perhaps accompanied by a message on their screens. Several seconds after the warning, all devices trigger the cheer, in unison, in series, or in some combination of unison and series cheering. The devices can guide the participants by sending text to the handheld devices, and the words can be highlighted as they are intended to be chanted out, using a wave-like appearance, for example, and/or highlighting a single word at a time.

Example 5

A Crowd, Sound-Effect Feature for a Plurality of Participants at an Event

A system can be developed for a user to experience the opportunity to project a crowd, sound-effect along with the crowd in a choreographed manner in response to a display from a handheld device at an event.

With this feature, a user can be offered the option of "activating" their system to project sounds of particular types from their handheld device as a crowd-sync experience. The sound can be controlled by an administrator, and all users who opt-in agree to have their sound triggered by the administrator. When the leader triggers such a sound-effect, all opted-in devices play the chosen sound through the speakers of the devices, in unison, in series, or some combination of unison and series.

Examples of such sound effects can include, but are not limited to:

1. When a baseball player swings and misses, a whooshing/wind sound is triggered.

2. When a hockey player is checked into the glass, or a basketball player has an errant shot that hits the glass backboard awkwardly, a breaking glass sound effect is triggered.

3. During high-impact plays—a bit hit in football, hockey, lacrosse, etc, a play at the plate where there is a big collision—the sound of bowling pins being knocked down follows.

Example 6

A Live Motion Feature for a Plurality of Participants at an Event

A system can be developed for a user to experience the opportunity to project a display along with the crowd in a choreographed manner in which a display is triggered in response to a motion made with a handheld device at an event.

In this application, a user can triggers a specific effect, such as audio, color strobe, sound, etc, based on making one or more types of motions with their mobile device. The device motion sensor/gyroscope detects the motion and triggers a pre-determined corresponding effect based on that motion. An example could be in making the motion of a "tomahawk chop" for the Atlanta Braves. Upon making the motion, perhaps a red strobe, Indian dancing music, and/or war screams will display from the device.

In some embodiments, the technology can simultaneously identify that numerous users are making the same motion in close proximity to each other (e.g., a crowd standing and waving in unison) and connects all devices in real time and delivers the pre-determined corresponding effect in sync, in unison, series, or a combination, across all users in that location.

Example 7

An Emergency Alert Feature, Crowd Management, for a Plurality of Participants at an Event A system can be developed for a user to experience the opportunity to receive emergency information along with the crowd in which a display is triggered in response to a user sending an alert to the crowd.

In some embodiments, the application can be used to alert a crowd about a child that is lost, abducted, or the like. In some embodiments, a crowd can be alerted about any of a number of events or possible events, such as weather advisory, traffic advisory, or other safety advisory notice. Such alerts can, of course, be accompanied by any one or any combination of media, including all text, audio, and video that can be used to properly alert a crowd. As such, the systems and methods taught herein can function as a means of alerting or managing a crowd regarding an actual or potential danger or crisis of most any type in manner that has not yet been made available, or developed and utilized, in procedure or practice in the state of the art of crowd management and control.

We claim:

1. A method of displaying media in a choreographed manner among independent participants in a crowd at an event, the method comprising:
   providing a choreographed, crowd forum at an event, the providing including offering to send a crowd media display to a plurality of participants in a crowd attending the event, each of the plurality of participants having:
   (i) a close-visual proximity to other participants; and,
   (ii) it's own respective computing device, connected to a server, with a graphical user interface, a processor,
   a database embodied in a non-transitory computer readable storage medium, and a choreography module embodied in a non-transitory computer readable storage medium, the respective computing device operable to at least receive and display a choreographed portions of the crowd media display from the server;
   wherein, each of the choreographed portions comprises one or more color strobes with audio and is configured to be received and displayed by each respective computing device for each of the plurality of participants in the crowd in one or more choreographed manners coordinated with a live activity at the event synchronously in real time by the server, facilitating a participation by each of the plurality of participants that includes at least receiving and displaying the choreographed portions of the crowd media display in response to one or more types of motion made by each participants own respective computing device.

2. The method of claim 1, further comprising offering to send a crowd media display to one or more virtual users having a virtual presence at the event through a network connection, each of the one or more virtual users having it's own respective computing device with a graphical user interface, a processor, a database embodied in a non-transitory computer readable storage medium, and a choreography module embodied in a non-transitory computer readable storage medium; wherein, each of the choreographed portions is configured to be received and displayed by each respective computing device within the one or more virtual users in the crowd in a choreographed manner coordinated with an activity at the event, facilitating a participation by each of the one or more virtual users that includes at least receiving and displaying it's respective choreographed portion of the crowd media display.

3. The method of claim 1, wherein the computing devices include a handheld device.

4. The method of claim 1, wherein the event is an entertainment event.

5. The method of claim 1, wherein the choreographed crowd media display includes audio, video, text, or a combination thereof.

6. The method of claim 1, wherein the choreographed crowd media display occurs among the plurality of participants in unison.

7. The method of claim 1, wherein the choreographed crowd media display occurs among the plurality of participants as a sequence of events.

8. The method of claim 1, wherein the computing devices include one or more handheld devices, and the sending or receiving of a crowd media display is controlled by a motion of the one or more handheld devices.

9. The method of claim 1, wherein the plurality of participants comprises at least 1000 participants.

10. The method of claim 1, further comprising a social networking functionality, the computing devices having a social networking module on a non-transitory computer readable medium for receiving and sending a social networking media to the respective graphical user interface, the social networking media comprising a component selected from the group consisting of a user-created marketplace display, a user-specific group display, a user-publicized event display, a user-customized public page display, a user-presence and chat display, and a combination thereof.

11. A system for displaying a portion of a choreographed crowd media display, the system comprising:
   a processor;
   a graphical user interface; and,
   a choreography module embodied in a non-transitory computer readable storage medium
   for receiving and displaying a choreographed portion of a crowd media display to the graphical user interface of one of a plurality of participants attending an event, each of the plurality of participants having:
   (i) a close-visual proximity to other participants; and,
   (ii) it's own respective computing device, connected to a server, with a graphical user interface, a processor,
   a database embodied in a non-transitory computer readable storage medium, and a choreography module embodied in a non-transitory computer readable storage medium, the respective computing device operable to at least receive and display a respective choreographed portion of the crowd media display from the server
   wherein, each of the choreographed portions comprises one or more color strobes with audio and is configured to be received and displayed by the choreography module of each respective computing device for each of the plurality of participants in the crowd in a choreographed manner coordinated with a live activity at the event synchronously in real time by the server, facilitating a participation by each of the plurality of participants that includes at least receiving and displaying it's respective choreographed portions of the crowd media display in response to one or more types of motion made by each participants own respective computing device.

12. The system of claim 11, further comprising a choreography module for a virtual user having a virtual presence at the event through a network connection, the choreography module embodied in a non-transitory computer readable storage medium for receiving and displaying a choreographed portion of a crowd media display to the graphical user interface of the virtual user; wherein, the choreographed portion is configured to be received and displayed by the virtual user in a choreographed manner coordinated with an activity at the event, facilitating a participation by the virtual user with the crowd that includes at least receiving and displaying it's respective choreographed portion of the crowd media display.

13. The system of claim 11, wherein the system comprises a handheld device.

14. The system of claim 11, wherein the event is an entertainment event.

15. The system of claim 11, wherein the media display includes audio, video, text, or a combination thereof.

16. The system of claim 11, wherein the choreography module is configured such that the media display occurs in unison with the choreographed crowd media display.

17. The system of claim 11, wherein the choreography module is configured such that the media display occurs as a portion of a sequence of events in the choreographed crowd media display.

18. The system of claim 11, wherein the choreography module includes an administrative function to facilitate an offering of the choreographed crowd media display to the plurality of participants.

19. The system of claim 11, wherein the plurality of participants comprises at least 1000 participants.

20. The system of claim 11, further comprising a social networking module on a non-transitory computer readable medium for receiving and sending a social networking media to the plurality of participants, the social networking media comprising a component selected from the group consisting of a user-created marketplace display, a user-specific group display, a user-publicized event display, a user-customized public page display, a user-presence and chat display, and a combination thereof.

21. A system for displaying media in portions among independent users in a crowd setting in a choreographed manner, the system comprising:
a shared processor;
a shared database embodied in a non-transitory computer readable storage medium for storing a choreographed crowd media display in portions for distribution, respectively, to each of a plurality of participants attending an event;
a shared distribution engine embodied in a non-transitory computer readable storage medium for distributing through a server the choreographed crowd media in the respective portions to each of the plurality of participants attending the event;
a first computing device having first processor; a first graphical user interface; and, a first choreography module embodied in a non-transitory computer readable storage medium for receiving and displaying a first media display to the first graphical user interface of a first participant within the plurality of participants; wherein, the first media display is a first portion of the choreographed crowd media display;
a second computing device having a second processor; a second graphical user interface; and, a second choreography module embodied in a non-transitory computer readable storage medium for receiving and displaying a second media display to the second graphical user interface of a second participant within the plurality of participants; wherein, the second media display is a second portion of the choreographed crowd media display; and,
an $n^{th}$ computing device having an $n^{th}$ processor; an $n^{th}$ graphical user interface; and, an $n^{th}$ choreography module embodied in a non-transitory computer readable storage medium for receiving and displaying an $n^{th}$ media display to the $n^{th}$ graphical user interface of an $n^{th}$ user within the plurality of participants; wherein, the $n^{th}$ media display is an $n^{th}$ portion of the choreographed crowd media display;
wherein, the event is an entertainment event;
n ranges from three to the total number of participants attending the event; and, each of the plurality of participants are offered an experience at the event that includes participating with the activity of the event, the experience including at least receiving and displaying it's respective choreographed portion of the crowd media display;
wherein, each of the choreographed crowd media displays comprises one or more color strobes with audio and is configured to be received and displayed by the first, second or $n^{th}$ choreography module of each respective computing device for each of the plurality of participants in the crowd in a choreographed manner coordinated with a live activity at the event synchronously in real time by distribution engine, facilitating a participation by each of the plurality of participants that includes at least receiving and displaying it's respective choreographed crowd media displays in response to one or more types of motion made by each participants own respective computing device.

22. The system of claim 21, further comprising a shared choreography module for a virtual user having a virtual presence at the event through a network connection, the choreography module embodied in a non-transitory computer readable storage medium for receiving and displaying a choreographed portion of a crowd media display to the graphical user interface of the virtual user; wherein, the choreographed portion is configured to be received and displayed by the virtual user in a choreographed manner coordinated with an activity at the event, facilitating a participation by the virtual user with the crowd that includes at least receiving and displaying it's respective choreographed portion of the crowd media display.

23. The system of claim 21, wherein the computing devices include a handheld device.

24. The system of claim 21, wherein the choreographed crowd media display includes audio, video, text, or a combination thereof.

25. The system of claim 21, wherein the choreography module is configured such that the media display occurs among the plurality of participants in unison.

26. The system of claim 21, wherein the choreography module is configured such that the media display occurs among the plurality of participants as a sequence of events.

27. The system of claim 21, wherein the shared choreography module includes an administrative function to facilitate an offering of the choreographed crowd media display to the plurality of participants.

28. The system of claim 21, wherein the computing devices include one or more handheld devices, and the sending or receiving of a crowd media display is controlled by a motion of the one or more handheld devices.

29. The system of claim 21, wherein the plurality of participants comprises at least 1000 participants.

30. The system of claim 21, further comprising a social networking functionality, the computing devices having a social networking module on a non-transitory computer readable medium for receiving, storing, and sending a social networking media to the respective graphical user interface, the social networking media comprising a component selected from the group consisting of a user-created marketplace display, a user-specific group display, a user-publicized event display, a user-customized public page display, a user-presence and chat display, and a combination thereof.

* * * * *